United States Patent
Klein et al.

(10) Patent No.: US 7,475,163 B1
(45) Date of Patent: Jan. 6, 2009

(54) METHOD AND SYSTEM FOR RESOLVING SAS TIMING ISSUES FOR LONG-DISTANCE SAS EXTENDER

(75) Inventors: Craig A. Klein, Tucson, AZ (US); Daniel James Winarski, Tucson, AZ (US); Timothy Allen Johnson, Tucson, AZ (US); Louie A. Dickens, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/015,655

(22) Filed: Jan. 17, 2008

(51) Int. Cl.
*G06F 3/00* (2006.01)
(52) U.S. Cl. .......................................................... 710/2
(58) Field of Classification Search .................. 710/2
See application file for complete search history.

(56) References Cited

U.S. PATENT DOCUMENTS

| | | | |
|---|---|---|---|
| 5,528,765 A * | 6/1996 | Milligan | 710/107 |
| 5,921,816 A | 7/1999 | Larabell | |
| 6,185,651 B1 | 2/2001 | Monia et al. | |
| 6,430,632 B1 | 8/2002 | Ain et al. | |
| 6,650,656 B2 | 11/2003 | Tyndall | |
| 6,848,007 B1 | 1/2005 | Reynolds et al. | |
| 7,035,952 B2 * | 4/2006 | Elliott et al. | 710/300 |
| 7,308,534 B2 * | 12/2007 | Mimatsu | 711/114 |
| 2004/0193736 A1 * | 9/2004 | Galloway | 710/1 |
| 2006/0004935 A1 * | 1/2006 | Seto et al. | 710/62 |
| 2007/0121621 A1 * | 5/2007 | Moretti et al. | 370/389 |
| 2008/0162773 A1 * | 6/2008 | Clegg et al. | 710/316 |

* cited by examiner

*Primary Examiner*—Alford W. Kindred
*Assistant Examiner*—Chun-Kuan Lee
(74) *Attorney, Agent, or Firm*—MaxValue IP, LLC

(57) ABSTRACT

This invention extends the distance at which a SAS extender can function. The distance is increased a large amount over the traditional 10 meters. As a result timers will not go off before the response can make a trip back. This is accomplished by emulating as a SAS expander, using SAS AIP's (Arbitration In Progress), and using a lookup table to determine which SAS events must be responded to immediately and which ones to be passed on to the remote link.

1 Claim, 4 Drawing Sheets

METHOD AND SYSTEM FOR RESOLVING SAS TIMING ISSUES FOR LONG-DISTANCE SAS EXTENDER

BACKGROUND OF THE INVENTION

The SCSI adapter devices and the SCSI controller devices for peripherals are simple and cost effective, highly standardized, and often built into the computers and peripherals designed for the bus. Each device on the bus has a priority, and the highest priority device for communication control has to win the rights for the use of the bus. The negotiation for the control of the bus is conducted within a predetermined time window to all devices, but each SCSI device on the bus acts independently for the detection of the time-window.

Serial Attached SCSI (SAS) is the next generation of the Small Computer System Interface (SCSI), used for connecting storage devices to a computer system. It has been developed as an alternative to the Fiber Channel interface (FC), offering similar performance and reduced cost, at the expense of connectivity and scalability. Because it is an electrical technology as opposed to optical, it has a distance limitation of 10 meters, making it useful only inside cabinets and for peripherals that are physically located next to the computer system that uses the interface. It would be useful to have a means of using the SAS technology without having to sacrifice the ability to have remote connectivity for storage. Unfortunately, the timings for SAS are such that the propagation delay associated with long distance links over one hundred meters will become problematic without a method to keep the SAS timers from popping. Hence it would be advantageous to have such a method.

SUMMARY OF THE INVENTION

The distance at which a SAS extender can function is greatly increased beyond the traditional 10 meters and thus the timers will not go off before the response can make a trip back. This is accomplished by:
  emulating as a SAS expander,
  using SAS AIP's (Arbitration In Progress), and
  using a lookup table to determine which SAS events must be responded to immediately and which ones to be passed on to the remote link.

DETAILED DESCRIPTION OF THE PREFERRED EMBODIMENTS

Figure 1:
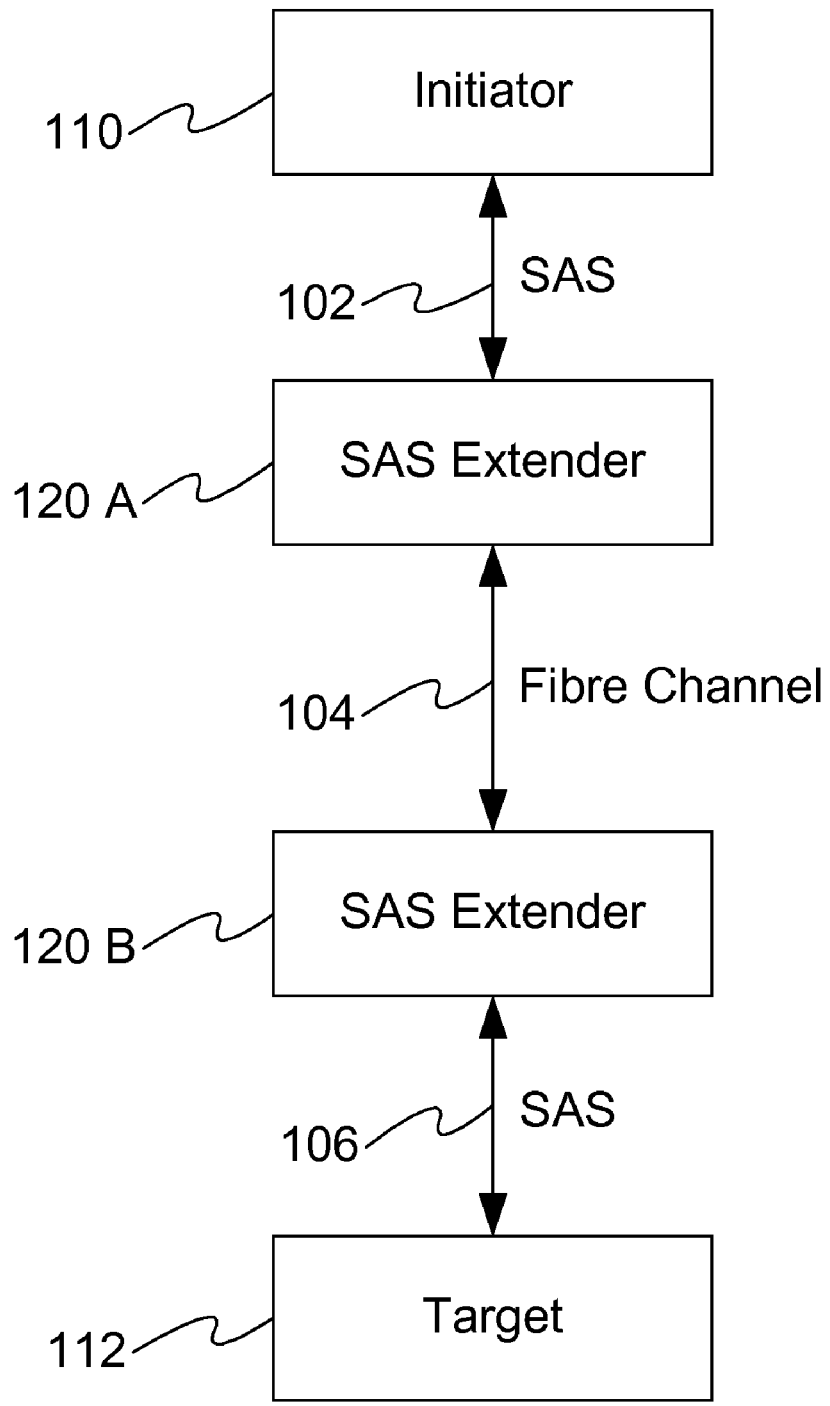
FIG. 1 is a schematic diagram of the SAS Extender.

FIG. 1 shows the topology of the SAS extender. Initiator 110 sends SAS traffic over SAS link 102, where it is encapsulated within fibre channel frames by SAS Extender 120A before forwarding over fibre channel link 104 to SAS extender 120B, where the fibre channel encapsulation is removed and the SAS traffic is forwarded to SAS target 112 over SAS link 106. When responding, SAS Target 112 sends traffic over SAS link 106 to SAS Extender 120B, which encapsulates the SAS traffic in a fibre channel frame and transmits over fibre channel link 104 to SAS Extender 120A, which removes the fibre channel encapsulation and forwards the traffic to the SAS initiator 110 over SAS link 102. A problem arises when the length of the fibre channel link is increased beyond approximately 100 meters, and the SAS timers go off before the response can make the trip back. Our invention alleviates this problem by responding immediately to the SAS traffic that requires it, and forwards traffic that does not.

SAS extender emulating SAS expander: When a Report General command is received by the SAS extender 120 over a SAS link, it responds indicating that it supports an expander. This allows the SAS extender to use the AIP primitive to indicate that an arbitration is in progress on the remote link, even though it may not be. This resets the Open Address timer so that it does not expire before receiving an Open Accept from the remote link (the target).

Even though the SAS extender emulates a SAS expander, it does not do discovery, but instead requires other expanders to update its routing table as known in the art.

A table is used to look at incoming SAS traffic to determine whether it must be immediately responded to as well as passed on to the remote link, or simply passed on to the remote link. In the case of traffic responded to immediately, the SAS extender then waits for the appropriate response from the remote link before proceeding.

Figure 2:
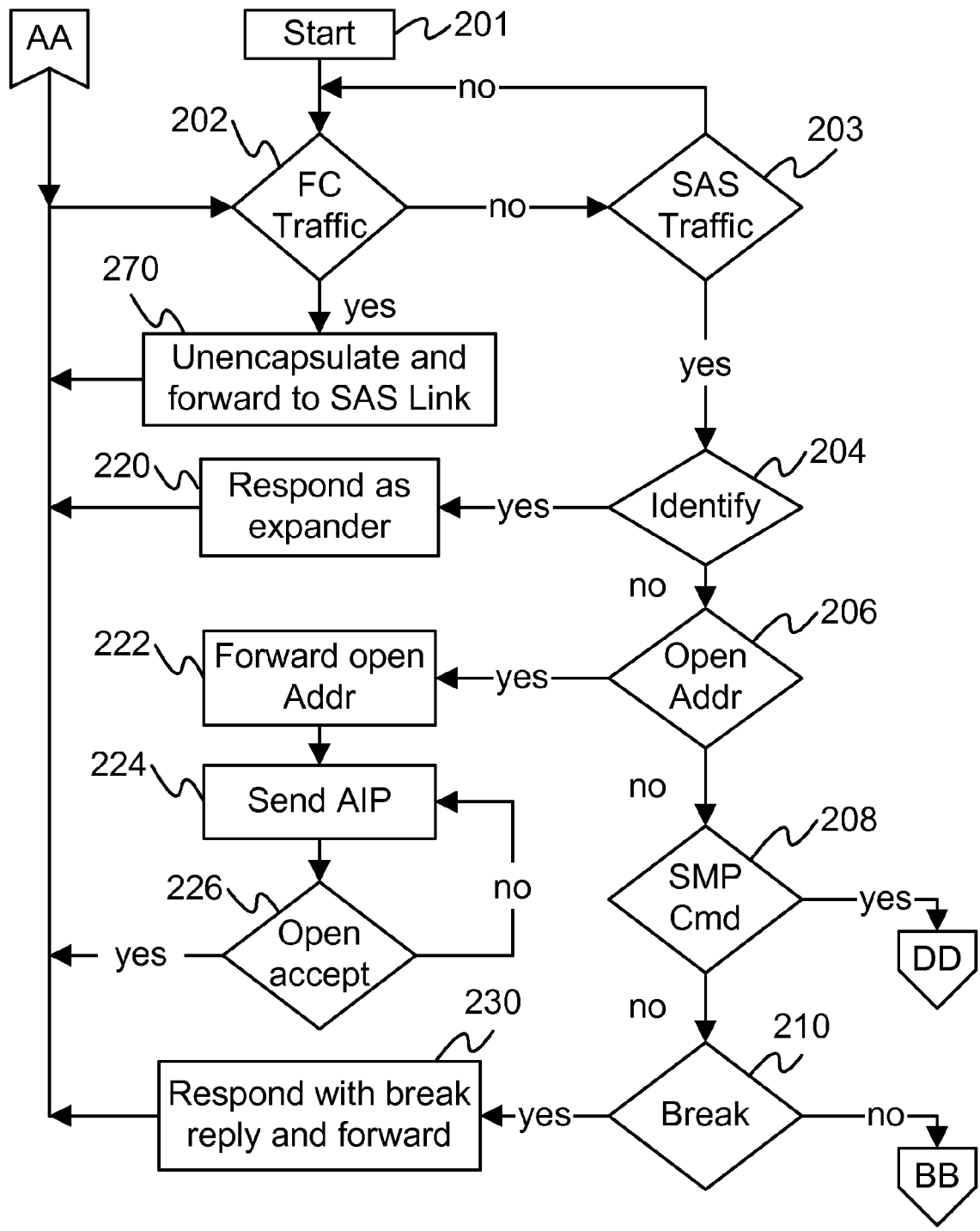
FIG. 2 is a data flow diagram showing every step that the SAS Extender follows.
Figure 3:
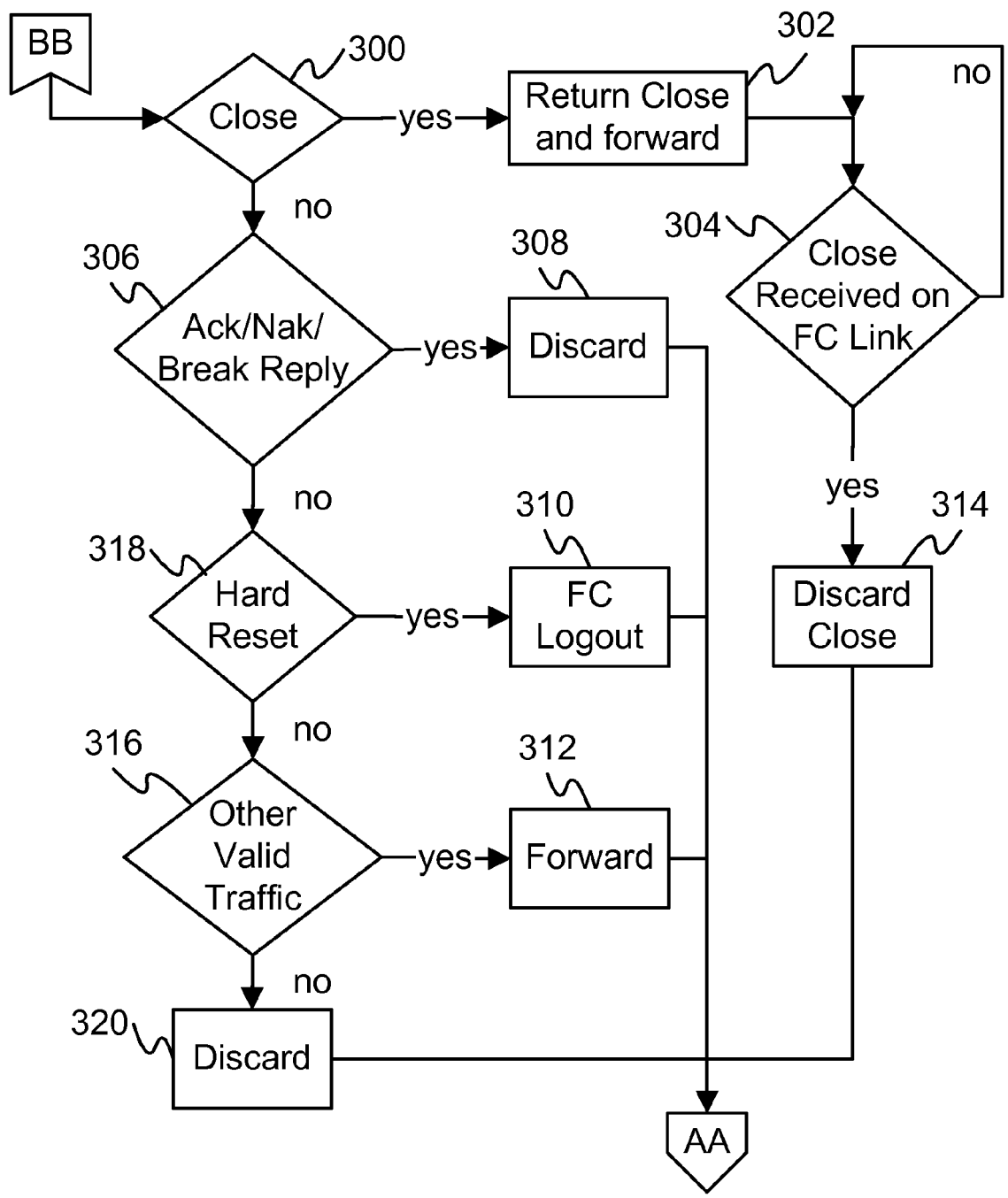
FIG. 3 is a data flow diagram (continuation of FIG. 2).
Figure 4:
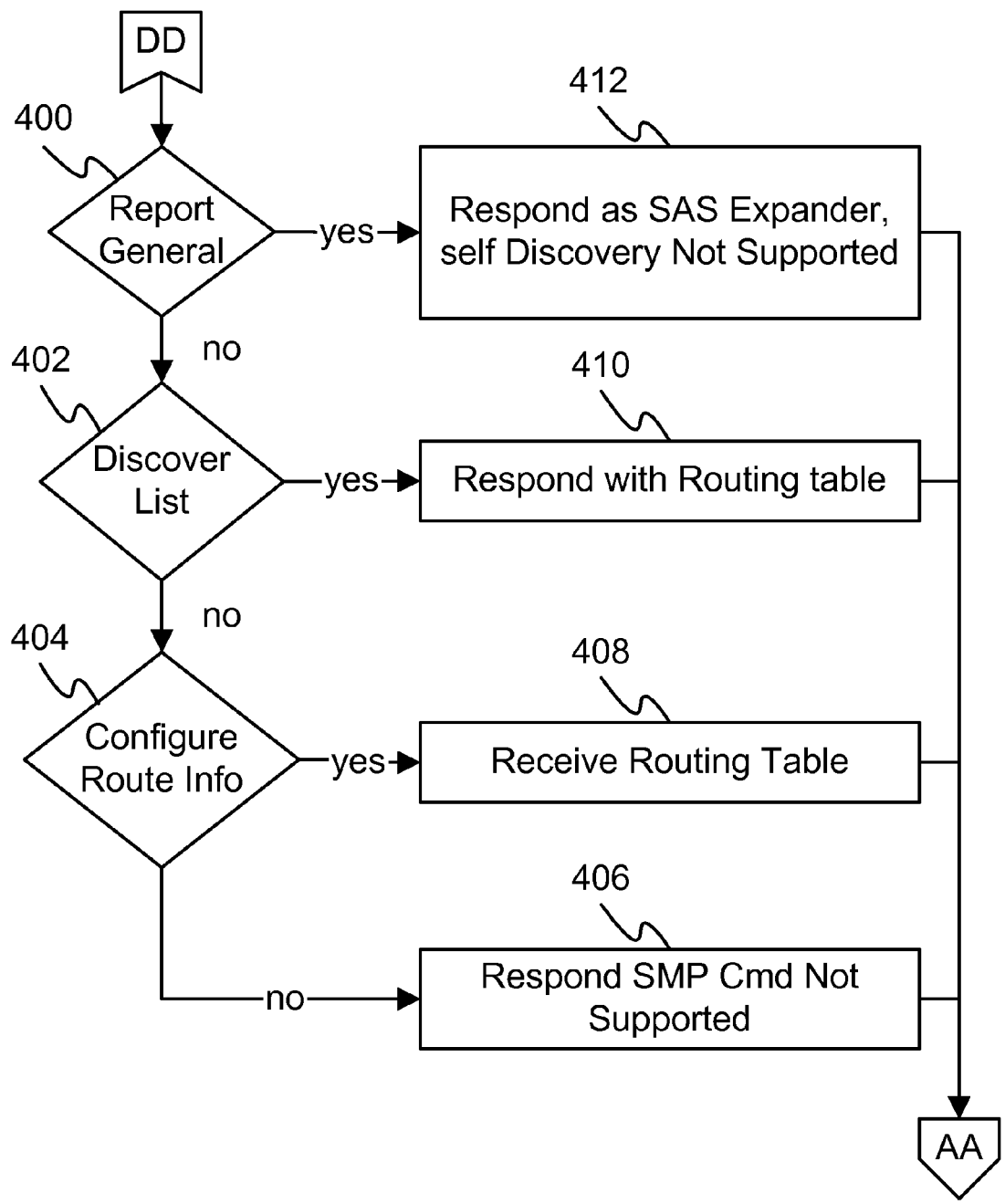
FIG. 4 is a data flow diagram (continuation of FIGS. 2 and 3).

FIGS. 1, 2 and 3 are complementary and they are a complete flow diagram of the invention.

The process begins at step 201, and flows to step 202, where it checks for fibre channel link traffic (traffic from FC 104 to the extender 120A). If fibre channel traffic is detected (yes), the process flows to step 270, where the encapsulation is removed and the unencapsulated SAS traffic is forwarded via the SAS link 102. The process then returns to check again.

If in step 202 no fibre channel traffic is detected (no), then the process moves to step 203, where it checks for SAS/SATA traffic. If SAS/SATA traffic has not been received (no), it returns to step 202. If SAS/SATA traffic has been received (yes), the process moves to step 204, where it checks whether an IDENTIFY frame has been received. If an IDENTIFY frame has been received (yes), then the process moves to step 220, and the extender responds as an expander. The process then returns to step 202, where it continues as previously described.

If in step 204, traffic is received but it is not an IDENTIFY frame (no), then the process continues at step 206, where it checks for an OPEN ADDRESS frame. If the traffic received is an OPEN ADDRESS frame (yes), the process flows to step 222, and the frame is encapsulated and forwarded to the fibre channel link. The process continues at step 224, where AIP is sent to the initiator 110 via the SAS link 102. The process then flows to step 226, where it checks whether an OPEN ACCEPT has been received on the fibre channel link 104. If an OPEN ACCEPT has not been received (no), the process returns to step 224 to send another AIP. If an OPEN ACCEPT has been received (yes), the process returns to step 202 as described previously.

If in step 206 the traffic received is not an OPEN ADDRESS frame (no), then the process flows to step 208, where it checks for an SMP frame. If the traffic is an SMP frame (yes), it then determines the type of SMP frame. In step 400, it checks if the SMP frame is a REPORT GENERAL frame. If it is a REPORT GENERAL frame (yes), then the process moves to step 412, where the extender responds to the frame as known in the art, indicating that the extender is a SAS expander with the Externally Configurable Route Table bit set to one. The process then returns to step 202.

If in step 400 the SMP frame is not a REPORT GENERAL frame, the process flows to step 402, where it checks if the frame is a DISCOVER or DISCOVER LIST frame. If it is a DISCOVER or DISCOVER LIST frame (yes), the process moves to step 410, where it responds with its routing table as known in the art. The process then returns to step 202.

If in step 402, the frame is not a DISCOVER or DISCOVER LIST frame (no), then the process flows to step 404, where it checks if the frame is a CONFIGURE ROUTE INFO command. If the traffic is a CONFIG ROUTE INFO command (yes), the process flows to step 408, where it receives and updates it's routing table. The process then returns to step 202.

If in step 404 the SMP command is not a CONFIG ROUTE INFO command, the process goes to step 406, where the extender responds with SMP COMMAND NOT SUPPORTED as known in the art. The process then returns to step 202.

If in step 208 the traffic is not an SMP command (no), the process moves to step 210, where it checks for a BREAK command. If the traffic is a BREAK command (yes), then the process flows to step 230, where it responds via the SAS/SATA link 102 with a BREAK REPLY, and encapsulates and forwards the BREAK command via the fibre channel link 104. The process then returns to step 202.

If in step 210 the traffic is not a BREAK command (no), the process moves to step 300, where it checks for a CLOSE command. If the received traffic is a CLOSE primitive (yes), the process continues at step 302, where it returns the CLOSE primitive via the SAS/SATA link, and then encapsulates and forwards the CLOSE primitive via the fibre channel link. The process then moves to step 304, where it looks for a corresponding CLOSE primitive to be received via the fibre channel link. If a CLOSE primitive is not received via the fibre channel link (no), the process returns to check again. If a CLOSE primitive is received (yes), the process discards the CLOSE primitive rather than forward it in step 314, and then returns to step 202.

If in step 300 the traffic received is not a CLOSE primitive (no) the process moves to step 306, where if checks if the received traffic is an ACK, a NAK, or a BREAK REPLY primitive. If yes, then the process flows to step 308, where the traffic is discarded, and the process then returns to step 202.

If in step 306 the traffic is not an ACK, a NAK, or a BREAK REPLY primitive (no), then the process moves to step 318, where it checks for a Hard Reset. If the received traffic is a Hard Reset (yes), the process moves to step 310, where it performs a fibre channel logout on the fibre channel link and then returns to step 202.

If in step 318 the traffic is not a Hard Reset (no), then the process flows to step 316, where it checks whether the received traffic is valid traffic. If the received traffic is valid (yes), the process moves to step 312, where it encapsulates the traffic and forwards it via the fibre channel link. The process then returns to step 202.

If in step 316 the received traffic is not valid (no), the process moves to step 320, where it discards the traffic and returns to step 202.

Below is the preferred embodiment of the invention:

A method for resolving serial attached small computer system interface timing issues for long distance serial attached small computer system interface extender, the method comprising the steps of:

an initiator sending serial attached small computer system interface traffic, over a first serial attached small computer system interface link, to a first serial attached small computer system interface extender;

wherein the first serial attached small computer system interface extender is connected to a second serial attached small computer system interface extender, through a fibre channel;

the first serial attached small computer system interface extender emulating a serial attached small computer system interface expander;

responding to a report general command received from the first serial attached small computer system interface link;

indicating that the first serial attached small computer system interface extender is a serial attached small computer system interface expander, by setting an externally configurable route table bit;

wherein the first serial attached small computer system interface extender having a lookup table;

based on the lookup table, the first serial attached small computer system interface extender determining whether to immediately respond on the first serial attached small computer system interface link, to encapsulate and forward the serial attached small computer system interface traffic toward a serial attached small computer system interface target via the fibre channel, or to do both to immediately respond on the first serial attached small computer system interface link and to encapsulate and forward the serial attached small computer system interface traffic toward the serial attached small computer system interface target via the fibre channel;

in case of first serial attached small computer system interface extender immediately responding on the first serial attached small computer system interface link and forwarding the serial attached small computer system interface traffic toward the serial attached small computer system interface target, the first serial attached small computer system interface extender monitoring for a corresponding response, coming via the fibre link, and handling the corresponding response, based on the lookup table;

the first serial attached small computer system interface extender encapsulating the serial attached small computer system interface traffic within frames of the fibre channel;

forwarding the encapsulated the serial attached small computer system interface traffic to the second serial attached small computer system interface extender;

removing the encapsulated the serial attached small computer system interface traffic; and forwarding the serial attached small computer system interface traffic to the serial attached small computer system interface target, over a second serial attached small computer system interface link.

Any variations of the above teaching are also intended to be covered by this patent application.

The invention claimed is:

1. A method for resolving serial attached small computer system interface timing issues for long distance serial attached small computer system interface extender, said method comprising the steps of:

an initiator sending serial attached small computer system interface traffic, over a first serial attached small computer system interface link, to a first serial attached small computer system interface extender;

wherein said first serial attached small computer system interface extender is connected to a second serial attached small computer system interface extender, through a fibre channel;

said first serial attached small computer system interface extender emulating a serial attached small computer system interface expander;

responding to a report general command received from said first serial attached small computer system interface link;

indicating that said first serial attached small computer system interface extender is the serial attached small computer system interface expander, by setting an externally configurable route table bit;

wherein said first serial attached small computer system interface extender having a lookup table;

based on said lookup table, said first serial attached small computer system interface extender determining whether to immediately respond on said first serial attached small computer system interface link, to encapsulate and forward said serial attached small computer system interface traffic toward a serial attached small computer system interface target via said fibre channel, or to do both to immediately respond on said first serial attached small computer system interface link and to encapsulate and forward said serial attached small computer system interface traffic toward said serial attached small computer system interface target via said fibre channel;

based on said lookup table, for resolving the timing issues including a first serial attached small computer system interface timer expiring due to the long distance interconnection between the first and the second serial attached small computer system interrface extender, when the first serial attached small computer system interface extender immediately responding on said first serial attached small computer system interface link and encapsulating and forwarding said serial attached small computer system interface traffic toward said serial attached small computer system interface target, said first serial attached small computer system interface extender monitoring for a corresponding response, coming via said fibre link, and handling said corresponding response, based on said lookup table, said first serial attached small computer system interface extender encapsulating said serial attached small computer system interface traffic within frames of said fibre channel;

forwarding said encapsulated said serial attached small computer system interface traffic to said second serial attached small computer system interface extender;

removing said encapsulated said serial attached small computer system interface traffic; and forwarding said serial attached small computer system interface traffic to said serial attached small computer system interface target, over a second serial attached small computer system interface link.

* * * * *